(12) United States Patent
Kusano

(10) Patent No.: US 11,015,940 B2
(45) Date of Patent: May 25, 2021

(54) SYSTEMS AND METHODS FOR LONGITUDINAL POSITION CORRECTION OF A VEHICLE USING MAPPED LANDMARKS

(71) Applicant: Toyota Motor Engineering & Manufacturing North America, Inc., Plano, TX (US)

(72) Inventor: Kristofer D. Kusano, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 297 days.

(21) Appl. No.: 15/929,033

(22) Filed: Jul. 13, 2018

(65) Prior Publication Data
US 2020/0018605 A1    Jan. 16, 2020

(51) Int. Cl.
*G01C 21/32* (2006.01)
*G06F 16/29* (2019.01)
(Continued)

(52) U.S. Cl.
CPC .............. *G01C 21/32* (2013.01); *G06F 16/29* (2019.01); *G06K 9/00818* (2013.01);
(Continued)

(58) Field of Classification Search
CPC ........... G01C 21/32; G06F 16/29; G06T 7/74; G06T 7/62; G06T 7/292;
(Continued)

(56) References Cited

U.S. PATENT DOCUMENTS 5,067,081 A * 11/1991 Person .................. G06F 15/025
701/533
6,339,745 B1 * 1/2002 Novik .................... G07C 5/008
342/357.31
(Continued)

OTHER PUBLICATIONS

Qu et al., "Vehicle Localization Using Mono-Camera and Geo-Referenced Traffic Signs," 2015 IEEE Intelligent Vehicles Symposium (IV), 605-610, COEX, Seoul, Korea (2015).
(Continued)

*Primary Examiner* — Frederick M Brushaber
(74) *Attorney, Agent, or Firm* — Christopher G. Darrow; Darrow Mustafa PC

(57) ABSTRACT

System, methods, and other embodiments described herein relate to correcting the longitudinal position of a vehicle using mapped landmarks. One embodiment identifies, in stored map data, a mapped landmark that is within a predetermined distance from the vehicle; identifies one or more detected stationary objects that are within a predetermined distance from the mapped landmark; tracks the one or more detected stationary objects for at least a first predetermined time period; matches, with the mapped landmark, a particular object among the one or more tracked detected stationary objects; tracks the particular object for at least a second predetermined time period; calculates a longitudinal distance between the particular object and the mapped landmark; and corrects the longitudinal position of the vehicle based on the longitudinal distance.

20 Claims, 7 Drawing Sheets

(51) Int. Cl.
| | |
|---|---|
| G06T 7/73 | (2017.01) |
| G06K 9/00 | (2006.01) |
| G06T 7/292 | (2017.01) |
| G06T 7/62 | (2017.01) |
| B60W 30/12 | (2020.01) |
| G01S 19/40 | (2010.01) |
| B62D 15/02 | (2006.01) |
| G01C 21/30 | (2006.01) |
| G01C 21/36 | (2006.01) |
| G01S 19/48 | (2010.01) |
| G01C 21/16 | (2006.01) |
| G06T 7/579 | (2017.01) |

(52) U.S. Cl.
CPC ............... G06T 7/292 (2017.01); G06T 7/62 (2017.01); G06T 7/74 (2017.01); *G06T 2207/10052* (2013.01); *G06T 2207/30252* (2013.01)

(58) Field of Classification Search
CPC . G06T 2207/10052; G06T 2207/30252; G06T 7/579; G06T 7/73; G06K 9/00818
See application file for complete search history.

(56) References Cited

U.S. PATENT DOCUMENTS

| | | | | |
|---|---|---|---|---|
| 6,526,352 | B1* | 2/2003 | Breed | G01S 19/11 |
| | | | | 701/470 |
| 7,610,146 | B2 | 10/2009 | Breed | |
| 10,635,110 | B2* | 4/2020 | Shashua | G01C 21/3407 |
| 2010/0110412 | A1 | 5/2010 | Basu et al. | |
| 2012/0310516 | A1* | 12/2012 | Zeng | G01S 19/46 |
| | | | | 701/300 |
| 2013/0103697 | A1* | 4/2013 | Hill | G06F 16/9537 |
| | | | | 707/748 |
| 2013/0332063 | A1* | 12/2013 | Pirwani | G01C 21/3638 |
| | | | | 701/409 |
| 2014/0244125 | A1* | 8/2014 | Dorum | G08B 23/00 |
| | | | | 701/70 |
| 2016/0161265 | A1* | 6/2016 | Bagheri | G01S 13/89 |
| | | | | 701/450 |
| 2016/0209846 | A1 | 7/2016 | Eustice et al. | |
| 2017/0010617 | A1* | 1/2017 | Shashua | B62D 15/025 |
| 2017/0075355 | A1 | 3/2017 | Micks et al. | |
| 2018/0024562 | A1* | 1/2018 | Bellaiche | G06T 7/73 |
| | | | | 701/26 |
| 2018/0025235 | A1* | 1/2018 | Fridman | G06K 9/00791 |
| | | | | 382/103 |
| 2018/0199995 | A1* | 7/2018 | Odermatt | A61B 5/055 |
| 2019/0271550 | A1* | 9/2019 | Breed | G08G 1/147 |
| 2019/0272389 | A1* | 9/2019 | Viente | G06K 9/00798 |
| 2020/0018605 | A1* | 1/2020 | Kusano | G01C 21/30 |
| 2020/0124422 | A1* | 4/2020 | Lin Sorstedt | G05D 1/0274 |

OTHER PUBLICATIONS

Brenner & Hofmann, "Evaluation of Automatically Extracted Landmarks for Future Driver Assistance Systems," The International Archives of the Photogrammetry, Remote Sensing and Spatial Information Science, vol. 38, Part II, 361-366 (2012).

Brenner, "Vehicle Localization Using Landmarks Obtained by a Lidar Mobile Mapping System," IAPRS, vol. XXXVIII, Part 3A, 139-144, France (2010).

Schlichting & Brenner, "Vehicle Localization by Lidar Point Correlation Improved by Change Detection," The International Archives of the Photogrammetry, Remote Sensing and Spatial Information Sciences, vol. XLI-B1, 703-710, Prague, Czech Republic (2016).

Levinson et al., "Map-Based Precision Vehicle Localization in Urban Environments," Stanford Artificial Intelligence Laboratory, http://www.roboticsproceedings.org/rss03/p16.pdf (last accessed Jul. 12, 2018).

Wolcott & Eustice, "Visual Localization within LIDAR Maps for Automated Urban Driving," University of Michigan, http://robots.engin.umich.edu/~rwolcott/uploads/rwolcott-2014a.pdf (last accessed Jul. 12, 2018).

Soheilian et al., "Detection and 3D Reconstruction of Traffic Signs from Multiple View Color Images," Elsevier, Jan. 27, 2013.

\* cited by examiner

SYSTEMS AND METHODS FOR LONGITUDINAL POSITION CORRECTION OF A VEHICLE USING MAPPED LANDMARKS

TECHNICAL FIELD

The subject matter described herein relates in general to vehicles and, more particularly, to techniques for correcting the longitudinal position of a vehicle.

BACKGROUND

One important aspect of modern vehicles, including autonomous vehicles, is localization, the process of determining where the vehicle is currently located relative to a reference such as digital map data. Localization of a vehicle on a roadway can be broken down into two sub-processes: (1) lateral positioning (where the vehicle is in its lane—side-to-side); and (2) longitudinal positioning (where the vehicle is along the roadway in the direction of travel).

There are several different ways of estimating longitudinal position. Two common approaches are by using the Global Positioning System (GPS) and by using inertial-measurement sensors that measure wheel speed to estimate the distance traveled during a given time period. Uncertainty in longitudinal positioning can arise from discrepancies between the position determined via the vehicle's sensors relative to the map data, which may not be highly precise. Moreover, in some situations, GPS satellites may not even be available (e.g., while the vehicle is traveling through a tunnel). This may force the vehicle to rely on dead reckoning from inertial-measurement sensors. Some inertial-measurement sensors tend to be somewhat noisy and inaccurate, resulting in a "drift" in the estimated longitudinal position. Even if high-accuracy GPS is available, the available map data may nevertheless be imprecise.

SUMMARY

An example of a system for correcting the longitudinal position of a vehicle is presented. The system comprises one or more processors and a memory communicably coupled to the one or more processors. The memory stores a landmark tracking module including instructions that, when executed by the one or more processors, cause the one or more processors to identify, in stored map data, a mapped landmark that is within a predetermined distance from the vehicle. The landmark tracking module also includes instructions to identify one or more detected stationary objects that are within a predetermined distance from the mapped landmark and to track the one or more detected stationary objects for at least a first predetermined time period. The landmark tracking module also includes instructions to match, with the mapped landmark, a particular object among the one or more tracked detected stationary objects and to track the particular object for at least a second predetermined time period. The landmark tracking module also includes instructions to calculate a longitudinal distance between the particular object and the mapped landmark. The memory also stores and a longitudinal position correction module including instructions that, when executed by the one or more processors, cause the one or more processors to correct the longitudinal position of the vehicle based on the longitudinal distance.

Another embodiment is a non-transitory computer-readable medium for correcting the longitudinal position of a vehicle and storing instructions that when executed by one or more processors cause the one or more processors to perform various actions. The computer-readable medium includes instructions to identify, in stored map data, a mapped landmark that is within a predetermined distance from the vehicle. It also includes instructions to identify one or more detected stationary objects that are within a predetermined distance from the mapped landmark and to track the one or more detected stationary objects for at least a first predetermined time period. The computer-readable medium also includes instructions to match, with the mapped landmark, a particular object among the one or more tracked detected stationary objects and to track the particular object for at least a second predetermined time period. The computer-readable medium also includes instructions to calculate a longitudinal distance between the particular object and the mapped landmark and to correct the longitudinal position of the vehicle based on the longitudinal distance.

Another embodiment is a method of correcting the longitudinal position of a vehicle, comprising identifying, in stored map data, a mapped landmark that is within a predetermined distance from the vehicle; identifying one or more detected stationary objects that are within a predetermined distance from the mapped landmark; tracking the one or more detected stationary objects for at least a first predetermined time period; matching, with the mapped landmark, a particular object among the one or more tracked detected stationary objects; tracking the particular object for at least a second predetermined time period; calculating a longitudinal distance between the particular object and the mapped landmark; and correcting the longitudinal position of the vehicle based on the longitudinal distance.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

An effective technique to correct the longitudinal position of a vehicle is to compare the position of a detected landmark with the landmark's expected position according to map data. Depending on the embodiment, landmarks can include, without limitation, road signs, trees, buildings, poles, markers, barriers, or other stationary objects. Road signs, in particular, are useful landmarks for longitudinal position correction. Map data that includes landmarks can be obtained from a digital map vendor, or a vehicle can be configured to create map data that includes landmarks as it travels from place to place.

In various embodiments, as the vehicle travels along a given route, the vehicle identifies landmarks in the map data (mapped landmarks) that are in the vicinity of the vehicle. Using its sensor systems (e.g., cameras, Light Detection and Ranging (LIDAR) sensors, or both), the vehicle detects one or more stationary objects in the vicinity and identifies among them those that could potentially match (i.e., coincide with) a mapped landmark. To increase the stability of the system, the vehicle tracks the candidate detected stationary objects for a predetermined period of time before attempting to match any particular detected stationary object with a given mapped landmark.

Once the minimum preliminary tracking period has elapsed, the system attempts to match a particular detected stationary object with a mapped landmark. If the predetermined matching criteria are satisfied, the particular detected stationary object is declared a match and is subsequently tracked for an additional minimum period of time to reduce the probability of false positives. If the particular object is successfully tracked for the requisite period, the difference or error in longitudinal position between the particular object and the corresponding mapped landmark is then used to correct the vehicle's longitudinal position.

To avoid the problem of stale measurements, in some embodiments, the particular object is tracked for up to a predetermined maximum period of time before the difference in longitudinal position between the particular object and that of the corresponding mapped landmark is used to correct the vehicle's longitudinal position.

The technique just described is, in some embodiments, used in conjunction with other longitudinal position correction techniques. In such embodiments, coordination between the technique described herein and the other techniques may be necessary, as those skilled in the art will recognize.

Figure 1:
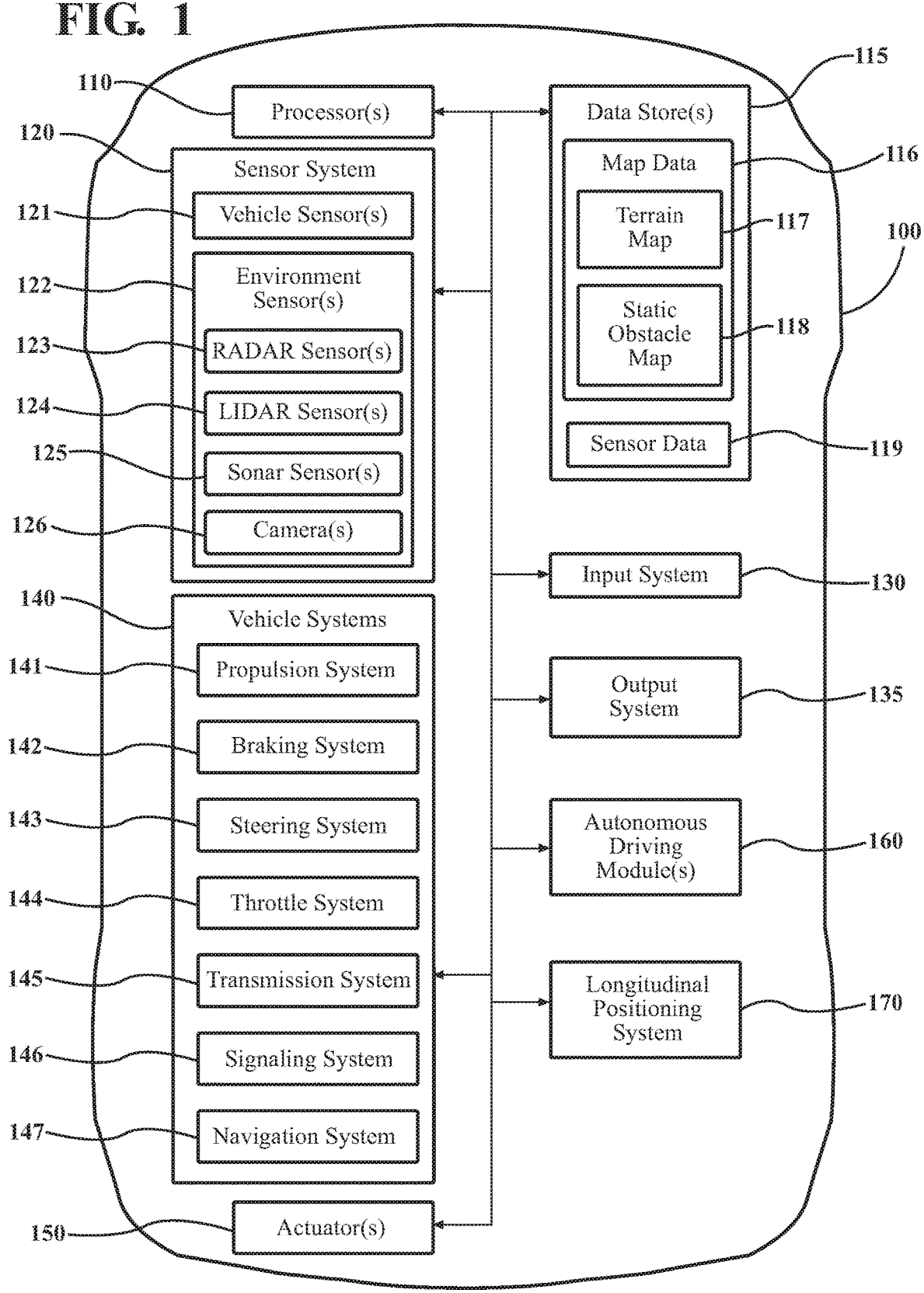
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any other form of motorized transport that, for example, can operate at least semi-autonomously.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-7 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

The vehicle 100 includes a longitudinal positioning system 170 that is implemented to perform methods and other functions as disclosed herein relating to ascertaining accurately the longitudinal position of the vehicle 100. Those methods and functions are described in greater detail in connection with FIGS. 2-7. In some embodiments, longitudinal positioning system 170 operates in conjunction with one or more autonomous or semi-autonomous driving modes of vehicle 100 to improve the accuracy of autonomous driving. In other embodiments, longitudinal positioning system operates when vehicle 100 is in a mostly or fully manual driving mode to provide more accurate information about the vehicle's current longitudinal position to a human driver for, e.g., navigation purposes.

Figure 2:
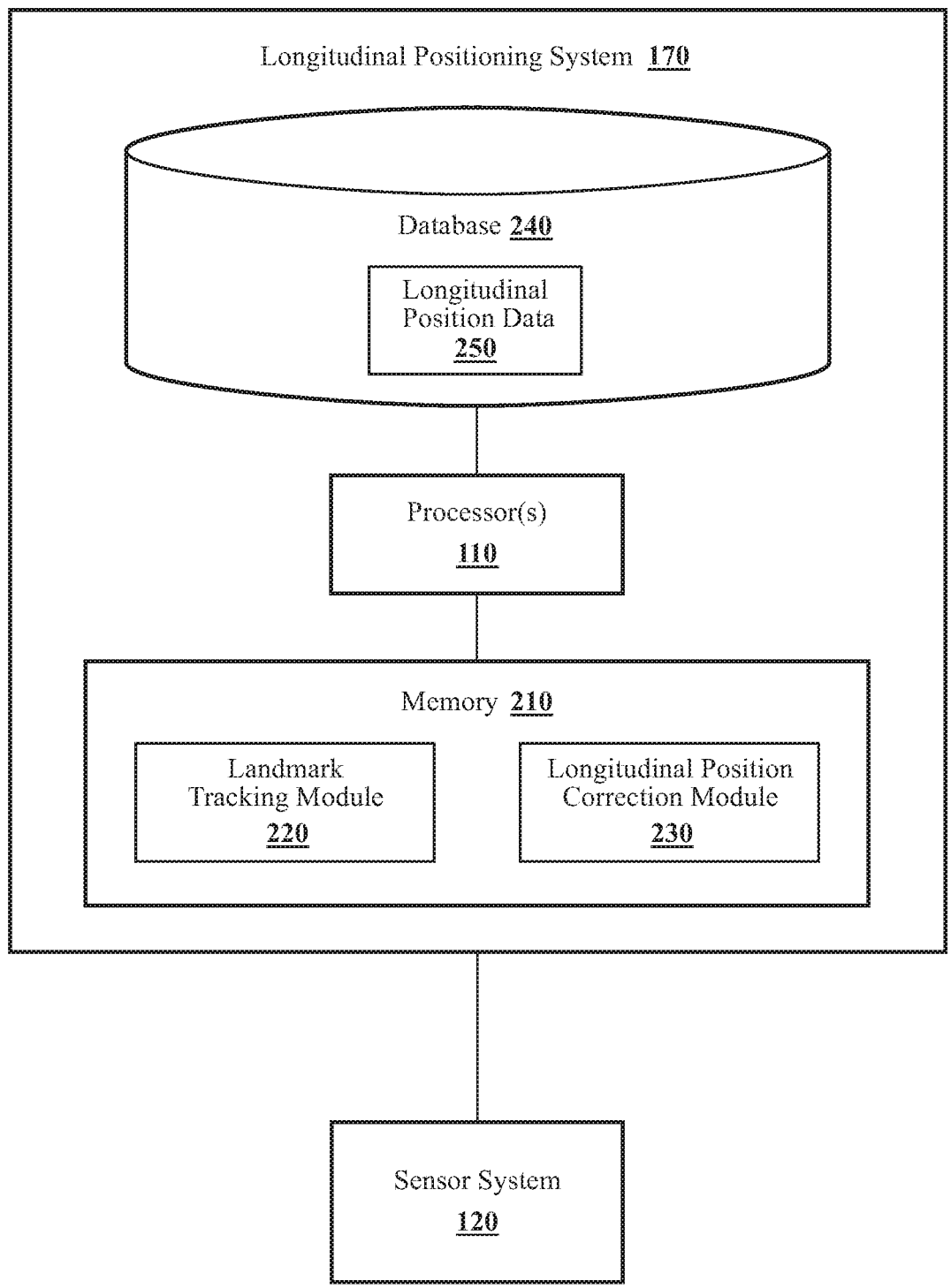
FIG. 2 illustrates one embodiment of a longitudinal positioning system.

With reference to FIG. 2, one embodiment of the longitudinal positioning system 170 of FIG. 1 is further illustrated. The longitudinal positioning system 170 is shown as including one or more processors 110 from the vehicle 100 of FIG. 1. Accordingly, the one or more processors 110 may be a part of the longitudinal positioning system 170, the longitudinal positioning system 170 may include a separate processor from the one or more processors 110 of the vehicle 100, or the longitudinal positioning system 170 may access the one or more processors 110 through a data bus or another communication path. In one embodiment, the longitudinal positioning system 170 includes a memory 210 that stores a landmark tracking module 220 and a longitudinal position correction module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 110, cause the processor 110 to perform the various functions disclosed herein.

The landmark tracking module 220 generally includes instructions that function to control the one or more processors 110 to track detected stationary objects relative to the mapped landmarks to which they correspond. As mentioned above, depending on the embodiment, landmarks for longitudinal position correction can include, without limitation, road signs, trees, buildings, poles, markers, barriers, or other stationary objects. Landmark tracking module 220 includes several aspects, each of which is discussed below. Those various aspects and the functions performed by longitudinal position correction module 230 are discussed in conjunction with FIGS. 3 and 4.

Figure 3:
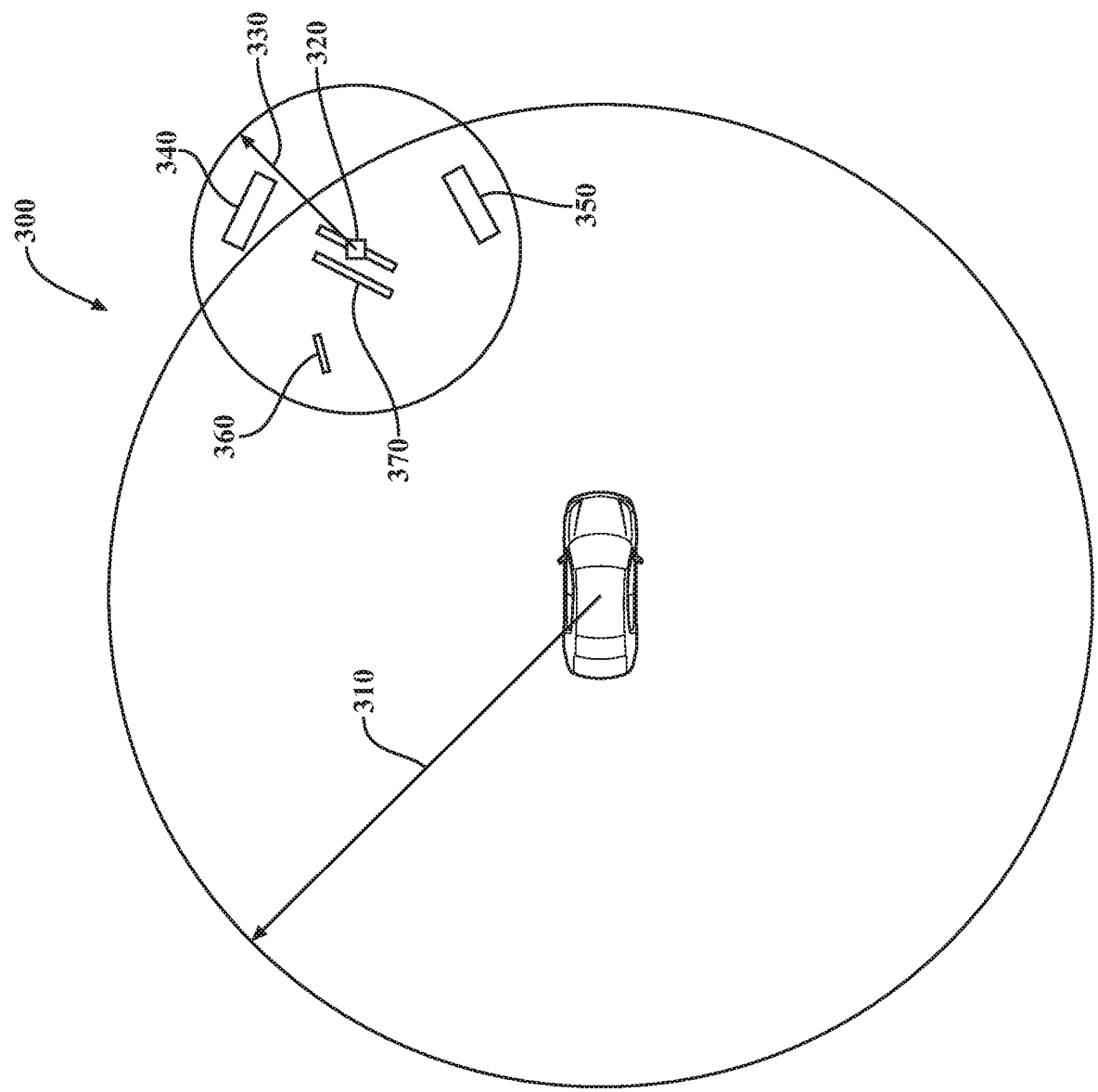
FIG. 3 illustrates an environment in which various illustrative embodiments of the invention can be implemented.

FIG. 3 illustrates an environment 300 in which various illustrative embodiments of the invention can be implemented. One aspect of landmark tracking module 220 is identifying, in stored map data, a mapped landmark 320 that is within a predetermined distance from vehicle 100 as vehicle 100 travels along a route. In this embodiment, that predetermined distance is mapped-landmarks search radius 310. As explained above, the map data including landmarks can be obtained from a map data vendor, or vehicle 100 can generate map data that includes landmarks as it travels from place to place (see the discussion of map data 116 in FIG. 1 below). In some embodiments, landmark tracking module 220 simultaneously processes a plurality or all mapped landmarks that lie within the mapped-landmarks search radius 310 from vehicle 100.

Another aspect of landmark tracking module 220 is identifying one or more detected stationary objects (340, 350, 360, and 370) that are within a predetermined distance, detected-objects search radius 330, from a given mapped landmark 320. The number of such objects shown in FIG. 3 (four) is arbitrary and is used for the sake of illustration only. In one embodiment, the vehicle 100 includes an object-detection system (not shown in FIGS. 1 and 2) that returns a list of objects in the environment surrounding vehicle 100 that have been detected by the sensor system 120 (see FIG. 1). As shown in FIG. 1, the sensors in sensor system 120 can include one or more cameras, one or more LIDAR sensors, and/or other types of sensors such as sonar or radar sensors. The types of sensors longitudinal positioning system 170 uses for longitudinal position correction differ, depending on the particular embodiment. In various embodiments, one or more cameras, one or more LIDAR sensors, or a combination of cameras and LIDAR sensors are used.

Landmark tracking module 220, in this embodiment, selects objects detected by the object-detection system that are classified as stationary, such as detected stationary objects 340-370 in FIG. 3, because those stationary objects could potentially be landmarks along the roadway. By identifying one or more detected stationary objects that are within the detected-objects search radius 330 from the mapped landmark 320, landmark tracking module 220 identifies one or more stationary objects (340-370) that are relatively close to the mapped landmark 320.

Another aspect of landmark tracking module 220 is tracking, for at least a first predetermined time period, the one or more detected stationary objects 340-370 that are within detected-objects search radius 330 from the mapped landmark 320. In one embodiment, the first predetermined time period is 3 seconds. In this context, "tracking" a detected stationary object means continuing to detect the object and keeping track of its position as vehicle 100 moves relative to the object. In some embodiments, sensor system 120 outputs updated data at a rate of 10 Hz, so a given stationary object can be repeatedly detected 10 times per second to permit the object to be tracked over a period of time. In some situations, a stationary object detected at one sensor sampling interval may not be detected at a later sampling interval. This can occur for a number of reasons, including obstructions intervening between vehicle 100 and the detected stationary object or the detected stationary object passing beyond the range of sensor system 120. Also, a stationary object detected at one sensor sampling interval and absent at a later sensor sampling interval can, in some cases, reappear at a still later sampling interval due to a temporary condition such as an obstruction that vehicle 100 passes.

Another aspect of landmark tracking module 220 is matching, with a mapped landmark, a particular object among the one or more tracked detected stationary objects 340-370. In the example of FIG. 3, this "particular object" is detected stationary object 370 (hereinafter referred to as "particular object 370"). This matching involves comparing the particular object 370 with the mapped landmark 320 and determining whether one or more predetermined matching criteria are satisfied. In one embodiment, the landmarks of interest are road signs, and the matching criteria are as follows: (1) the width of the particular object 370 matches that of the mapped landmark 320 (a particular road sign) to within a predetermined width tolerance and (2) the heading angle of the particular object 370 matches that of the mapped landmark 320 (the particular road sign) to within a predetermined heading-angle tolerance. Other matching criteria can be used for road signs or for other types of landmarks, depending on the embodiment.

Another aspect of landmark tracking module 220 is tracking a particular object 370 for at least a second predetermined time period before correcting the longitudinal position of vehicle 100 based on that particular object 370. In one embodiment, the second predetermined time period is approximately 400 ms. Requiring that a particular object 370 be tracked for a minimum period before correcting the longitudinal position of vehicle 100 reduces false positives, an advantage over existing longitudinal positioning systems. As mentioned above, to avoid the problem of stale longitudinal distance calculations, landmark tracking module 220, in some embodiments, includes instructions to track a particular object 370 for up to a maximum third predetermined time period before passing its longitudinal position calculation (discussed below) to the longitudinal position correction module 230. In one embodiment, the third predetermined time period is approximately 1 second.

Figure 4:
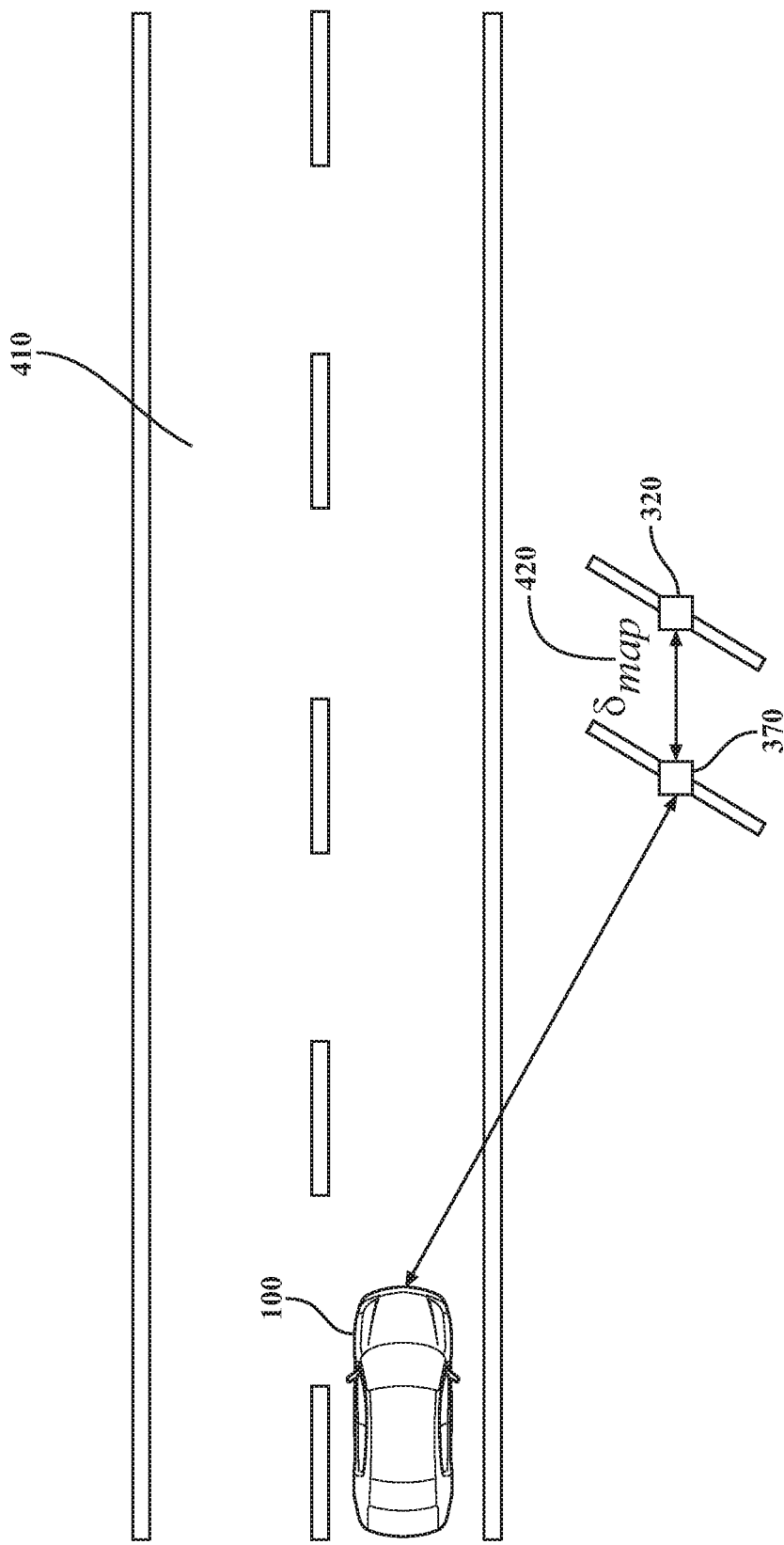
FIG. 4 illustrates the use of a detected and matched particular object and a mapped landmark to correct longitudinal position, in accordance with various illustrative embodiments of the invention.

Another aspect of landmark tracking module 220 is calculating a longitudinal distance between the particular object 370 and the mapped landmark 320. This calculated longitudinal distance is the difference or error between the position of the mapped landmark 320 and the position of the particular object 370. FIG. 4 illustrates the use of a detected and matched particular object 370 and a mapped landmark 320 to correct the longitudinal position of vehicle 100, in accordance with various illustrative embodiments of the invention. In FIG. 4, vehicle 100 is traveling along a roadway 410. Landmark tracking module 220 has already identified a mapped landmark 320 and is tracking a particular object 370, as discussed above. At different points in time, depending on the embodiment, landmark tracking module 220 calculates the longitudinal distance 420 ($\delta_{map}$) between particular object 370 and mapped landmark 320. It is longitudinal distance 420, whether it is a single calculation or an average or some other combination of multiple calculations, on which longitudinal position correction module 230 subsequently bases its correction of the longitudinal position of vehicle 100.

How the correction in longitudinal position is calculated differs, depending on the embodiment. In some embodiments, landmark tracking module 220 calculates longitudinal distance 420 repeatedly during the above-mentioned period of tracking (the second predetermined time period) as the particular object 370 is repeatedly detected. In some embodiments, landmark tracking module 220 calculates longitudinal distance 420 only once after the second predetermined time period has elapsed. In other embodiments, landmark tracking module 220 calculates longitudinal distance 420 repeatedly as particular object 370 is detected and tracked, as mentioned above, but only the last (most recent) calculation is used in performing longitudinal position correction. In another embodiment, landmark tracking module 220 averages the repeated calculations of longitudinal distance 420 obtained during tracking, and correction module 230 corrects the longitudinal position of vehicle 100 by that amount.

In the embodiment shown in FIG. 2, landmark tracking module 220 stores its calculations of longitudinal distance 420 as part of longitudinal position data 250 in database 240. Data pertaining to detected stationary objects (e.g., 340-370 in FIG. 3) and particular objects (370 in FIG. 3) are also stored in database 240 as part of longitudinal position data 250.

Vehicle 100 stores, in memory 210, its current longitudinal position. This stored longitudinal position is updated as vehicle 100 travels from place to place. Correcting the longitudinal position of vehicle 100 means making adjustments to the vehicle's stored longitudinal position so that it is more closely in agreement with the map data. This becomes most important when vehicle 100 is about to perform a maneuver such as turning onto an off-ramp while operating autonomously or when a driver operating the vehicle 100 in manual mode needs accurate longitudinal position information to locate a particular address on a crowded city street.

Longitudinal position correction module 230 includes instructions that, when executed by the one or more processors 110, cause the one or more processors 110 to correct the longitudinal position of vehicle 100 based on the longitudinal distance 420 calculated by landmark tracking module 220. The correction is based on the calculated longitudinal distance 420 (the difference or error discussed above) between the positions of the particular object 370 and the corresponding mapped landmark 320, respectively. As discussed above, the calculated longitudinal distance 420 used to correct the longitudinal position of vehicle 100 may be an average or some other combination of multiple calculations, or it may be a single calculation (in one embodiment, the most recent).

Figure 5:
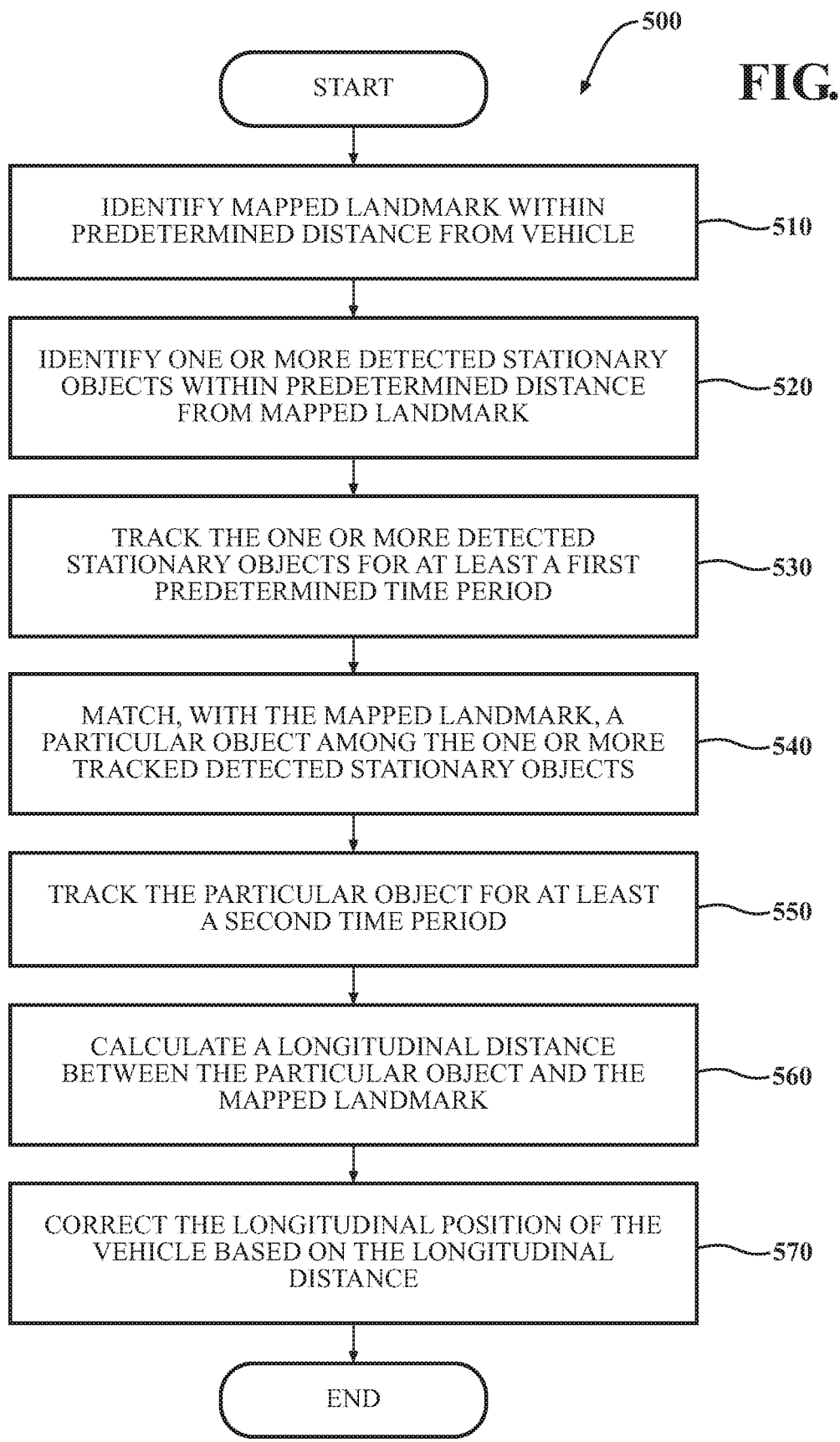
FIG. 5 is a flowchart of a method of correcting the longitudinal position of a vehicle, in accordance with an illustrative embodiment of the invention.

FIG. 5 is a flowchart of a method 500 of correcting the longitudinal position of a vehicle 100, in accordance with an illustrative embodiment of the invention. At block 510, landmark tracking module 220 examines map data 116 to identify a mapped landmark 320 within a mapped-landmarks search radius 310 from vehicle 100. In some embodiments, landmark tracking module 220 identifies a plurality or all mapped landmarks that lie within the mapped-landmarks search radius 310 from vehicle 100.

At block 520, landmark tracking module 220 identifies one or more detected stationary objects that are within a detected-objects search radius 330 from the mapped landmark 320. In one embodiment, the vehicle 100 includes an object-detection system that returns a list of objects in the environment surrounding vehicle 100 that have been detected by the sensor system 120 (see FIG. 1). As discussed above, the sensors in sensor system 120 can include one or more cameras, one or more LIDAR sensors, and other types of sensors such as sonar or radar sensors. The types of sensors longitudinal positioning system 170 uses for longitudinal position correction differ, depending on the particular embodiment. In various embodiments, one or more cameras, one or more LIDAR sensors, or a combination of cameras and LIDAR sensors are used.

At block 530, landmark tracking module 220 tracks the one or more detected stationary objects 340-370 for at least a first predetermined time period. In this context, "tracking" a detected stationary object means continuing to detect the object and keeping track of its position as vehicle 100 moves relative to the object.

At block 540, landmark tracking module 220 matches, with mapped landmark 320, a particular object 370 among the one or more tracked detected stationary objects 340-370. This process of matching involves comparing the particular object 370 with the mapped landmark 320 and determining whether one or more predetermined matching criteria are satisfied. The matching criteria differ from embodiment to embodiment depending on the kind of landmarks being detected, tracked, and matched.

At block 550, landmark tracking module 220 tracks the particular object 370 for at least a second predetermined time period. Requiring that a particular object 370 be tracked for a minimum period before correcting the longitudinal position of vehicle 100 based on that particular object 370 can reduce false positives, which is an advantage over existing longitudinal positioning systems.

At block 560, landmark tracking module 220 calculates the longitudinal distance 420 between the particular object 370 and the mapped landmark 320. The specifics of how longitudinal distance 420 is calculated differ depending on the embodiment, as discussed above. In some embodiments, longitudinal distance 420 is based on a single calculation. In other embodiments, multiple calculations of longitudinal distance 420 made at different times as particular object 370 is being tracked are combined (e.g., averaged).

At block 570, longitudinal position correction module 230 corrects the longitudinal position of vehicle 100 based on the calculated longitudinal distance 420 produced by landmark tracking module 220.

Figure 6:
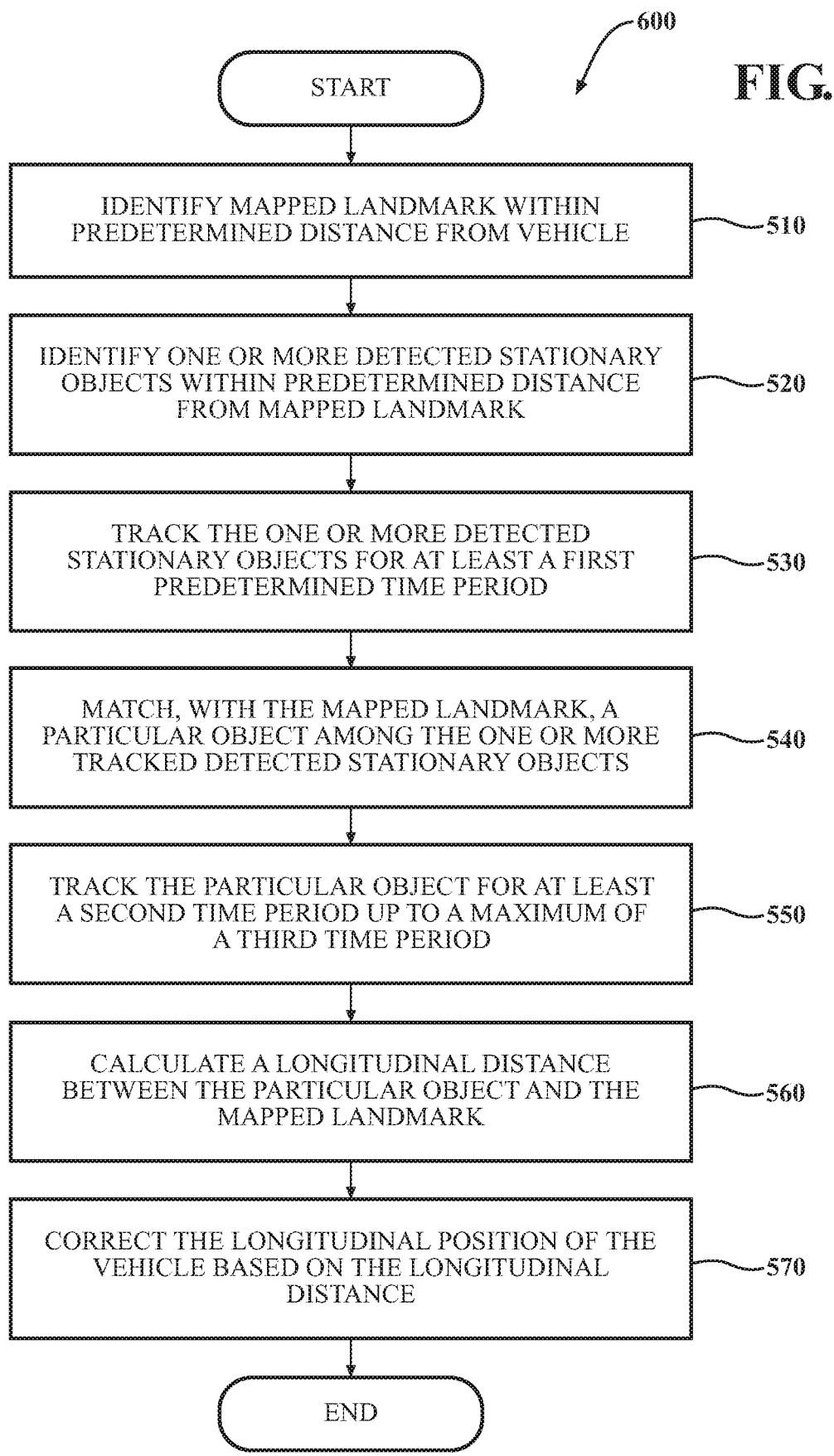
FIG. 6 is a flowchart of a method of correcting the longitudinal position of a vehicle, in accordance with another illustrative embodiment of the invention.

FIG. 6 is a flowchart of a method 600 of correcting the longitudinal position of a vehicle 100, in accordance with another illustrative embodiment of the invention. Method 600 proceeds similarly to method 500 discussed above but differs at block 610. In some instances, longitudinal positioning calculations can become stale. To ensure that this does not occur, landmark tracking module 220, in this embodiment, includes instructions to track a particular object 370 for up to a maximum third predetermined time period before passing its longitudinal position calculation to the longitudinal position correction module 230.

Figure 7:
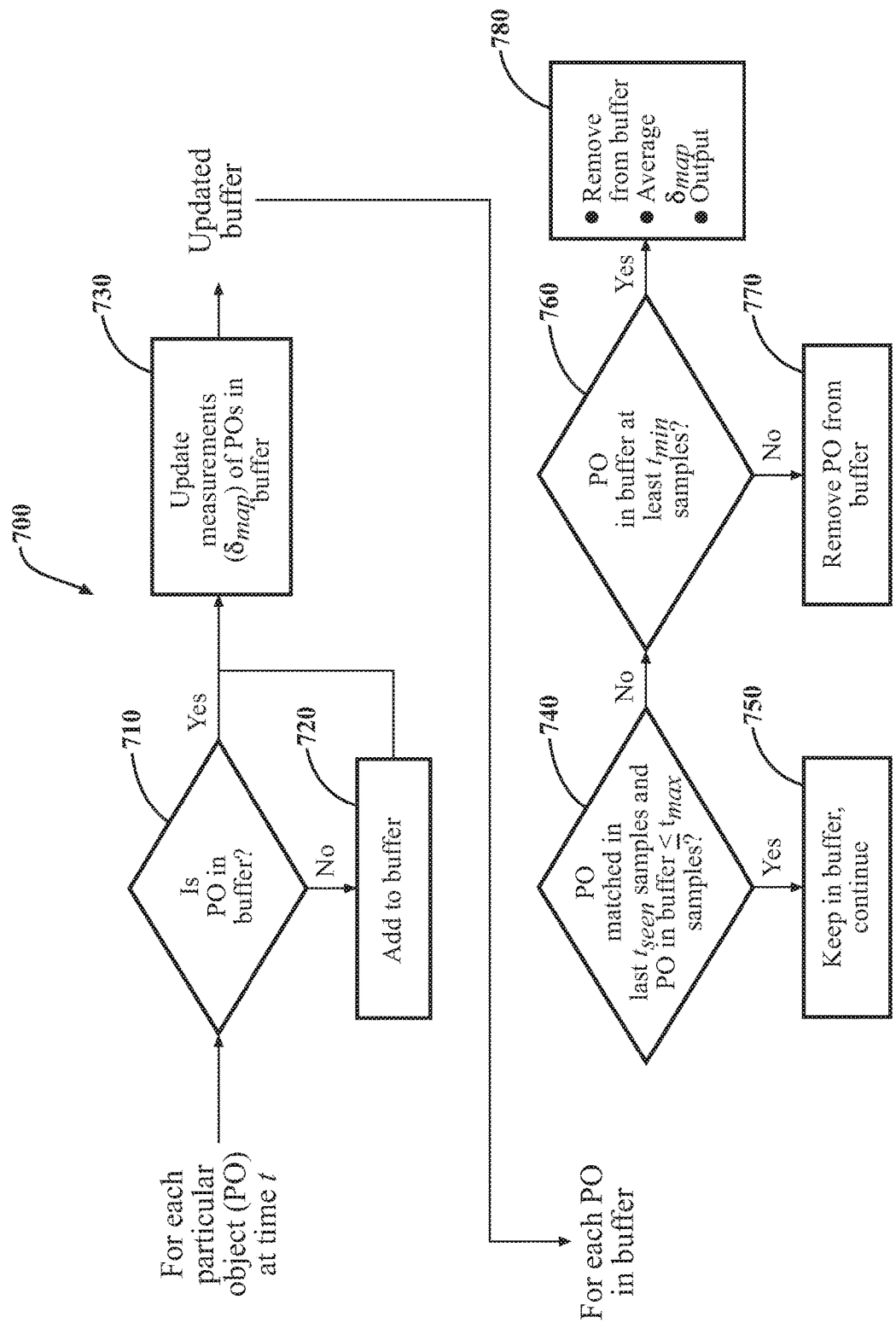
FIG. 7 is a flowchart of a method of tracking matched detected stationary objects to correct a vehicle's longitudinal position, in accordance with an illustrative embodiment of the invention.

FIG. 7 is a flowchart of a method 700 of tracking matched detected stationary objects to correct a vehicle's longitudinal position, in accordance with an illustrative embodiment of the invention. FIG. 7 provides additional details regarding the underlying logic for performing the actions in blocks 550 and 560 in FIG. 5 and blocks 610 and 560 in FIG. 6. In the embodiment of FIG. 7, the mapped landmarks 320 of interest are road signs. Method 700 is performed for each particular object 370 (i.e., for each detected stationary object that matches a mapped road sign) at a time t. In FIG. 7, the acronym "PO" is used to stand for "particular object." In this embodiment, a plurality of particular objects 370 matching a respective plurality of mapped landmarks 320 (mapped road signs) can be tracked simultaneously.

At block 710, landmark tracking module 220 determines whether the particular object 370 is in a tracking buffer. If not, it is added to the buffer at 720. If the particular object 370 is already in the buffer at block 710, landmark tracking module 220 recalculates longitudinal distance 420 for that particular object 370 at block 730 (refer to FIG. 4). The remaining steps of method 700 are performed for each particular object 370 in the buffer.

At block 740, landmark tracking module 220 determines whether particular object 370 has been detected in the last $t_{seen}$ samples of sensor system 120 and whether particular object 370 has been in the buffer less than or equal to $t_{max}$ samples of sensor system 120. In one embodiment, $t_{seen}$ corresponds to a time period of approximately 200 ms, and $t_{max}$ corresponds to a time period of approximately 1 second. If particular object 370 has been detected within the last $t_{seen}$ samples at block 740 and has not been in the buffer longer than $t_{max}$ samples, landmark tracking module 220 keeps the particular object 370 in the buffer at block 750. Otherwise, control passes to block 760. At block 760, landmark tracking module 220 determines whether the particular object 370 has been in the buffer at least $t_{min}$ samples of sensor system 120. In one embodiment, $t_{min}$ corresponds to a time period of approximately 400 ms. If, at block 760, particular object 370 is determined not to have been in the buffer for the requisite minimum period $t_{min}$, particular object 370 is removed from the buffer at block 770. If, at block 760, particular object 370 is determined to have been in the buffer for at least $t_{min}$ samples, landmark tracking module 220, at block 780, removes particular object 370 from the tracking buffer, computes an average of the calculations of longitudinal distance 420 for particular object 370 obtained during tracking, and outputs longitudinal distance 420 to longitudinal position correction module 230 for correction of the longitudinal position of vehicle 100.

In the embodiment of FIG. 7, $t_{min}$ corresponds to the "second predetermined time period" discussed above, and $t_{max}$ corresponds to the "third predetermined time period" discussed above. Recall that the "first predetermined time period" is the period during which landmark tracking module 220 tracks detected stationary objects before attempting to match them with mapped landmarks 320.

FIG. 1 will now be discussed in full detail as an example vehicle environment within which the system and methods disclosed herein may operate. In some instances, the vehicle 100 is configured to switch selectively between an autonomous mode, one or more semi-autonomous operational modes, and/or a manual mode. Such switching, also referred to as handover when transitioning to a manual mode, can be implemented in a suitable manner, now known or later developed. "Manual mode" means that all of or a majority of the navigation and/or maneuvering of the vehicle is performed according to inputs received from a user (e.g., human driver/operator).

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver/operator. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route. Thus, in one or more embodiments, the vehicle 100 operates autonomously according to a particular defined level of autonomy. For example, the vehicle 100 can operate according to the Society of Automotive Engineers (SAE) automated vehicle classifications 0-5. In one embodiment, the vehicle 100 operates according to SAE level 2, which provides for the autonomous driving module 160 controlling the vehicle 100 by braking, accelerating, and steering without operator input but the driver/operator is to monitor the driving and be vigilant and ready to intervene with controlling the vehicle 100 if the autonomous module 160 fails to properly respond or is otherwise unable to adequately control the vehicle 100.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operably connected to the processor(s) 110 for use thereby. The term "operably connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangement, the map data 116 can include one or more terrain maps 117. The terrain map(s) 117 can include information about the ground, terrain, roads, surfaces, and/or other features of one or more geographic areas. The map data 116 can be high quality and/or highly detailed. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, posts, roadway delineators, reflective markers, railings, guardrails, guardrail end terminals, medians, road structures such as bridges, bridge abutments, tunnel entrances, walls, culverts, storm drains, utility poles, statues, monuments, signs (e.g., road or traffic signs), benches, furniture, mailboxes, markings on the road surface, cracks on the road surface, large rocks, and hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operably connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras, infrared (IR) cameras and so on. In one embodiment, the cameras 126 include one or more cameras disposed within a passenger compartment of the vehicle for performing eye-tracking on the operator/driver in order to determine a gaze of the operator/driver, an eye track of the operator/driver, and so on.

The vehicle 100 can include an input system 130. An "input system" includes any device, component, system, element or arrangement or groups thereof that enable information/data to be entered into a machine. The input system 130 can receive an input from a vehicle passenger (e.g. a driver or a passenger). The vehicle 100 can include an output system 135. An "output system" includes any device, component, or arrangement or groups thereof that enable information/data to be presented to a vehicle passenger (e.g. a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The navigation system 147 can include one or more devices, sensors, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the longitudinal positioning system 170, and/or the autonomous driving module(s) 160 can be operably connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the longitudinal positioning system 170, and/or the autonomous driving module(s) 160 may control some or all of these vehicle systems 140 and, thus, may be partially or fully autonomous.

The processor(s) 110, the longitudinal positioning system 170, and/or the autonomous driving module(s) 160 can be operably connected to communicate with the various vehicle systems 140 and/or individual components thereof. For example, returning to FIG. 1, the processor(s) 110, the longitudinal positioning system 170, and/or the autonomous driving module(s) 160 can be in communication to send and/or receive information from the various vehicle systems 140 to control the movement, speed, maneuvering, heading, direction, etc. of the vehicle 100. The processor(s) 110, the longitudinal positioning system 170, and/or the autonomous driving module(s) 160 may control some or all of these vehicle systems 140.

The processor(s) 110, the longitudinal positioning system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the longitudinal positioning system 170, and/or the autonomous driving module(s) 160 can control the direction and/or speed of the vehicle 100. The processor(s) 110, the longitudinal positioning system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operably connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the longitudinal positioning system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g. one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for correcting the longitudinal position of a vehicle, the system comprising:
   one or more processors;
   a non-transitory memory communicably coupled to the one or more processors and storing:
   a first plurality of instructions that when executed by the one or more processors cause the one or more processors to:
      identify, in stored map data, a mapped landmark that is within a first predetermined distance from the vehicle;
      identify one or more detected stationary objects that are within a second predetermined distance from the mapped landmark;
      track the one or more detected stationary objects for at least a first predetermined time period;
      match, with the mapped landmark, a particular object among the one or more tracked detected stationary objects;
      track the particular object for at least a second predetermined time period; and
      calculate a longitudinal distance between the particular object and the mapped landmark; and
   a second plurality of instructions that when executed by the one or more processors cause the one or more processors to correct the longitudinal position of the vehicle based on the longitudinal distance.

2. The system of claim 1, wherein the mapped landmark is a road sign.

3. The system of claim 2, wherein the first plurality of instructions include instructions to match, with the mapped landmark, a particular object among the one or more tracked detected stationary objects by determining that a width of the particular object matches a width of the road sign to within a predetermined width tolerance and that a heading angle of the particular object matches a heading angle of the road sign to within a predetermined heading-angle tolerance.

4. The system of claim 1, wherein the first plurality of instructions include instructions to track the particular object for up to a maximum of a third predetermined time period before the longitudinal position of the vehicle is corrected based on the longitudinal distance.

5. The system of claim 1, wherein the first plurality of instructions include instructions to calculate a longitudinal distance between the particular object and the mapped landmark based on a most recent detection of the particular object.

6. The system of claim 1, wherein the first plurality of instructions include instructions to calculate a longitudinal distance between the particular object and the mapped landmark by averaging a plurality of longitudinal-distance calculations based on a plurality of detections of the particular object.

7. The system of claim 1, wherein the one or more detected stationary objects that are within the second predetermined distance from the mapped landmark are detected using at least one of camera data and Light Detection and Ranging (LIDAR) data.

8. A non-transitory computer-readable medium for correcting the longitudinal position of a vehicle and storing instructions that when executed by one or more processors cause the one or more processors to:
identify, in stored map data, a mapped landmark that is within a first predetermined distance from the vehicle;
identify one or more detected stationary objects that are within a second predetermined distance from the mapped landmark;
track the one or more detected stationary objects for at least a first predetermined time period;
match, with the mapped landmark, a particular object among the one or more tracked detected stationary objects;
track the particular object for at least a second predetermined time period;
calculate a longitudinal distance between the particular object and the mapped landmark; and
correct the longitudinal position of the vehicle based on the longitudinal distance.

9. The non-transitory computer-readable medium of claim 8, wherein the mapped landmark is a road sign.

10. The non-transitory computer-readable medium of claim 9, wherein the instructions to match, with the mapped landmark, a particular object among the one or more tracked detected stationary objects include instructions to determine that a width of the particular object matches a width of the road sign to within a predetermined width tolerance and that a heading angle of the particular object matches a heading angle of the road sign to within a predetermined heading-angle tolerance.

11. The non-transitory computer-readable medium of claim 8, wherein the stored instructions include further instructions that when executed by the one or more processors cause the one or more processors to track the particular object for up to a maximum of a third predetermined time period before the longitudinal position of the vehicle is corrected based on the longitudinal distance.

12. The non-transitory computer-readable medium of claim 8, wherein the stored instructions include instructions to calculate a longitudinal distance between the particular object and the mapped landmark based on a most recent detection of the particular object.

13. The non-transitory computer-readable medium of claim 8, wherein the stored instructions include instructions to calculate a longitudinal distance between the particular object and the mapped landmark by averaging a plurality of longitudinal-distance calculations based on a plurality of detections of the particular object.

14. A method of correcting the longitudinal position of a vehicle, the method comprising:
identifying, in stored map data, a mapped landmark that is within a first predetermined distance from the vehicle;
identifying one or more detected stationary objects that are within a second predetermined distance from the mapped landmark;
tracking the one or more detected stationary objects for at least a first predetermined time period;
matching, with the mapped landmark, a particular object among the one or more tracked detected stationary objects;
tracking the particular object for at least a second predetermined time period;
calculating a longitudinal distance between the particular object and the mapped landmark; and
correcting the longitudinal position of the vehicle based on the longitudinal distance.

15. The method of claim 14, wherein the mapped landmark is a road sign.

16. The method of claim 15, wherein matching, with the mapped landmark, a particular object among the one or more tracked detected stationary objects includes determining that a width of the particular object matches a width of the road sign to within a predetermined width tolerance and that a heading angle of the particular object matches a heading angle of the road sign to within a predetermined heading-angle tolerance.

17. The method of claim 14, further comprising:
tracking the particular object for up to a maximum of a third predetermined time period before the longitudinal position of the vehicle is corrected based on the longitudinal distance.

18. The method of claim 14, wherein calculating a longitudinal distance between the particular object and the mapped landmark is based on a most recent detection of the particular object.

19. The method of claim 14, wherein calculating a longitudinal distance between the particular object and the mapped landmark includes averaging a plurality of longitudinal-distance calculations based on a plurality of detections of the particular object.

20. The method of claim 14, wherein the one or more detected stationary objects that are within the second predetermined distance from the mapped landmark are detected using at least one of camera data and Light Detection and Ranging (LIDAR) data.

* * * * *